(12) United States Patent
Konda et al.

(10) Patent No.: US 12,069,512 B2
(45) Date of Patent: Aug. 20, 2024

(54) TRUNCATION OF A PACKET DATA UNIT (PDU) FOR UPLINK TRANSMISSIONS

(71) Applicant: Apple Inc., Cupertino, CA (US)

(72) Inventors: Abhishek Anand Konda, Newark, CA (US); Murtaza A. Shikari, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/484,358

(22) Filed: Sep. 24, 2021

(65) Prior Publication Data

US 2023/0096568 A1 Mar. 30, 2023

(51) Int. Cl.
*H04W 28/04* (2009.01)
*H04L 1/1607* (2023.01)
*H04L 5/00* (2006.01)
*H04W 80/02* (2009.01)

(52) U.S. Cl.
CPC .......... *H04W 28/04* (2013.01); *H04L 1/1614* (2013.01); *H04L 5/0053* (2013.01); *H04W 80/02* (2013.01)

(58) Field of Classification Search
CPC .... H04W 28/04; H04W 80/02; H04L 1/1614; H04L 5/0053
See application file for complete search history.

(56) References Cited

U.S. PATENT DOCUMENTS

2019/0230667 A1* 7/2019 Loehr ..................... H04W 8/02
2020/0205224 A1* 6/2020 Lee ..................... H04W 28/065
2020/0351725 A1* 11/2020 Kim .................. H04W 36/0069
2021/0314810 A1* 10/2021 Kanamarlapudi .... H04L 1/1864
2022/0173837 A1* 6/2022 Kainulainen ......... H04L 1/1829
2023/0090249 A1* 3/2023 Fan ................... H04W 28/0278

OTHER PUBLICATIONS

3GPP TS 36.322 V16.0.0 (Jul. 2020); 3rd Generation Partnership Project; Technical Specification Group Radio Access Network; Evolved Universal Terrestrial Radio Access (E-UTRA); Radio Link Control (RLC) protocol specification (Release 16). (Year: 2020).*
3GPP Ts 38.322 V16.2.0 (2020-12); 3rd Generation Partnership Project; Technical Specification Group Radio Access Network; NR ; Radio Link Control (RLC) protocol specification; (Release 16) (Year: 2020).*

(Continued)

*Primary Examiner* — Mohammed S Chowdhury
(74) *Attorney, Agent, or Firm* — Sterne, Kessler, Goldstein & Fox P.L.L.C.

(57) ABSTRACT

Some aspects of this disclosure relate to apparatuses and methods for a user equipment (UE) to send a portion of a packet data unit (PDU) to a base station. A radio link control (RLC) layer of the UE generates a PDU and a truncation indicator, where the truncation indicator can indicate a set of truncation points of the PDU. A medium access control (MAC) layer determines whether an uplink transmission size based on an uplink grant is smaller than a first number of bytes included in the PDU. In response to a determination that the uplink transmission size is smaller than the first number of bytes, the MAC layer selects a truncation point from the set of truncation points indicated by the truncation indicator, and remove at least a portion of the PDU to generate a truncated PDU having a second number of bytes smaller than the uplink transmission size.

20 Claims, 14 Drawing Sheets

(56) References Cited

OTHER PUBLICATIONS

3GPP TSG-RAN2#109bis-e; R2-2003767; Source to WG: Qualcomm Incorporated, Verizon; Title: RLC status report truncation; Apr. 20-30, 2020. (Year: 2020).*

3GPP, "3rd Generation Partnership Project; Technical Specification Group Radio Access Network; Evolved Universal Terrestrial Radio Access (E-UTRA); Radio Link Control (RLC) protocol specification (Release 16)," 3GPP TS 36.322 V16.0.0 (Jul. 2020) Technical Specification, 47 pages, Jul. 2020.

3GPP, "3rd Generation Partnership Project; Technical Specification Group Radio Access Network; Evolved Universal Terrestrial Radio Access (E-UTRA); Packet Data Convergence Protocol (PDCP) specification (Release 16)," 3GPP TS 36.323 V16.3.0 (Dec. 2020) Technical Specification, 56 pages, Dec. 2020.

3GPP, "3rd Generation Partnership Project; Technical Specification Group Radio Access Network; NR; Radio Link Control (RLC) protocol specification (Release 16)," 3GPP TS 38.322 V16.2.0 (Dec. 2020) Technical Specification, 33 pages, Dec. 2020.

3GPP, "3rd Generation Partnership Project; Technical Specification Group Radio Access Network; NR; Packet Data Convergence Protocol (PDCP) specification (Release 16)," 3GPP TS 38.323 V16.4.0 (Jun. 2021) Technical Specification, 40 pages, Jun. 2021.

\* cited by examiner

| | |
|---|---|
| D/C | Oct 1 |
| CPT | Oct 2 |
| ACK_SN | Oct 3 |
| ACK_SN 20 E1 1 R | Oct 4 |
| NACK_SN | Oct 5 |
| NACK_SN | Oct 6 |
| NACK_SN 10 E1 1 E2 0 E3 0 R | Oct 7 |
| NACK_SN | Oct 8 |
| NACK_SN | Oct 9 |
| NACK_SN 11 E1 1 E2 1 E3 1 R | Oct 10 |
| SOstart | Oct 11 |
| SOstart 10 | Oct 12 |
| SOend | Oct 13 |
| SOend 100 | Oct 14 |
| NACK range 3 | Oct 15 |
| NACK_SN | Oct 16 |
| NACK_SN | Oct 17 |
| NACK_SN 16 E1 1 E2 1 E3 0 R | Oct 18 |
| SOstart | Oct 19 |
| SOstart 10 | Oct 20 |
| SOend | Oct 21 |
| SOend 100 | Oct 22 |
| NACK_SN | Oct 23 |
| NACK_SN | Oct 24 |
| NACK_SN 16 E1 0 E2 1 E3 0 R | Oct 25 |
| SOstart | Oct 26 |
| SOstart 800 | Oct 27 |
| SOend | |
| SOend 1200 | Oct 28 |

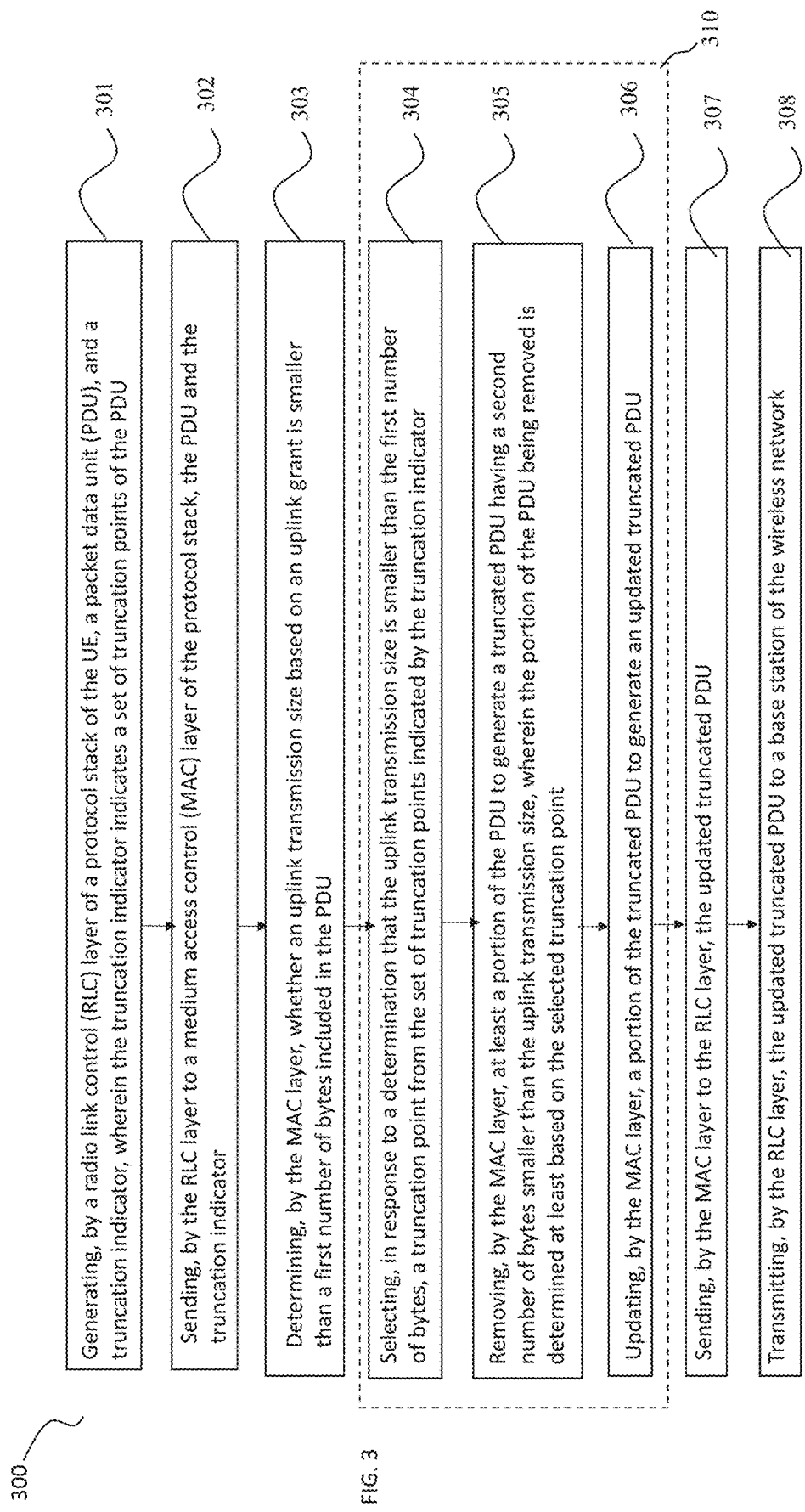

TRUNCATION OF A PACKET DATA UNIT (PDU) FOR UPLINK TRANSMISSIONS

BACKGROUND

Field

The described aspects generally relate to wireless communication, including truncation of a packet data unit (PDU) for uplink transmissions in a wireless network.

Related Art

There are various wireless networks. The 3rd Generation Partnership Project (3GPP) has developed a new radio-access technology known as fifth generation (5G) New Radio (NR). The 5G wireless technology is designed to address a wide range of use cases categorized into the enhanced mobile broadband (eMBB), ultra-reliable and low latency communication (URLLC), and massive machine-type communication (mMTC), among others. Example applications may include industrial wireless sensor networks, video surveillance, or wearables.

In a wireless network, a user equipment (UE) may communicate with a base station in an uplink and the base station may communicate with the LTE in a downlink. A channel condition between the UE and the base station may degrade depending on the situations. Performance improvement of the communication between the UE and the base station when the channel condition degrade can be a challenge.

SUMMARY

Some aspects of this disclosure relate to apparatuses and methods for implementing mechanisms to remove a portion of a packet data unit (PDU) to obtain a truncated PDU based on an uplink transmission size determined by an uplink grant. In order for a user equipment (UE) to transmit information to a base station, an uplink grant may be sent from the base station to the UE, where the uplink grant may indicate resource allocations such as an uplink transmission size. When the channel condition between the UE and the base station degrades, the uplink transmission size may be reduced. Hence, efficient mechanism may be desired to adjust a PDU of a large size to obtain a truncated PDU that fits to the uplink transmission size determined by an uplink grant.

Some aspects of this disclosure relate to a method for wireless communications by a UE in a wireless network. The UE can store a protocol stack that includes at least a radio link control (RLC) layer and a Medium Access Control (MAC) layer. The method can include generating, by a RLC layer of a protocol stack of the UE, a PDU, and a truncation indicator. The truncation indicator can indicate a set of truncation points of the PDU. One instance of a truncation point in the set of truncation points can indicate a negatively acknowledged sequence number (NACK-SN).

The method can further include sending, by the RLC layer to a MAC layer of the protocol stack, the PDU and the truncation indicator. The MAC layer can determine whether an uplink transmission size based on an uplink grant is smaller than a first number of bytes included in the PDU. The MAC layer can further select, in response to a determination that the uplink transmission size is smaller than the first number of bytes, a truncation point from the set of truncation points indicated by the truncation indicator. The PDU and the truncation indicator can be generated by RLC layer, and the selection of the truncation point from the set of truncation points can be performed by the MAC layer.

According to some aspects, the MAC layer can remove at least a portion of the PDU to generate a truncated PDU having a second number of bytes smaller or equal to the uplink transmission size. The portion of the PDU being removed can be determined at least based on the selected truncation point. The selection of the truncation point can include selecting a truncation point from the set of truncation points resulting in the truncated PDU having a size that is closest to the uplink transmission size among the set of truncation points of the PDU. The PDU can include a sequence of ordered bytes, and the removed portion can include consecutive bytes at an end portion of the sequence of ordered bytes.

According to some aspects, the method can further include updating, by the MAC layer, a portion of the truncated PDU to generate an updated truncated PDU. Afterwards, the method can include sending, by the MAC layer to the RLC layer, the updated truncated PDU; and transmitting, by the RLC layer, the updated truncated PDU to a base station of the wireless network. After the PDU is truncated, truncation status can be indicated to RLC layer, which can be used to generate next RLC status PDU to include discarded portion of truncated status PDU and new status.

According to some aspects, the truncation indicator can be implemented by an array of truncation points, and an element of the array indicates a byte position associated with a truncation point in the sequence of ordered bytes of the PDU. In some embodiments, the truncation indicator can further include a list of truncation information for an element of the array of truncation points. In some embodiments, the truncation indicator can be implemented by a bitmap having a first number of bits, where a bit of the bitmap corresponds to a byte of the PDU, and the bit can be of a value 0 or a value 1. In some embodiments, the bitmap can be a first bitmap, and the truncation indicator further includes a second bitmap having the first number of bits, where a bit of the second bitmap corresponds to a byte of the PDU, the bit is of a value 0 or a value 1. The truncation point selected from the set of truncation points can be determined by the first bitmap and the second bitmap. In some embodiments, the truncation indicator can further include a list of truncation information for one or more bits in the bitmap.

Some aspects of this disclosure relate to a UE includes a transceiver, a memory, and a processor communicatively coupled to the transceiver and the memory. The transceiver is configured to enable wireless communication in a wireless network. The memory stores a protocol stack of the UE, where the protocol stack includes at least a RLC layer and a MAC layer. The processor is configured to generate, by the RLC layer, a PDU, and a truncation indicator. The truncation indicator indicates a set of truncation points of the PDU. The processor is further configured to send, by the RLC layer to the MAC layer, the PDU and the truncation indicator; and determine, by the MAC layer, whether an uplink transmission size based on an uplink grant is smaller than a first number of bytes included in the PDU. In response to a determination that the uplink transmission size is smaller than the first number of bytes, the processor can be further configured to select a truncation point from the set of truncation points indicated by the truncation indicator, and remove, by the MAC layer, at least a portion of the PDU to generate a truncated PDU having a second number of bytes smaller than the uplink transmission size. The portion of the PDU being removed can be determined at least based on the selected truncation point.

Some aspects of this disclosure relate to non-transitory computer-readable medium storing instructions. When executed by a processor of a UE, the instructions stored in the non-transitory computer-readable medium cause the UE to perform various operations. The operations can include generating, by a RLC layer of a protocol stack of the UE, a PDU, and a truncation indicator, where the truncation indicator indicates a set of truncation points of the PDU; sending, by the RLC layer to a MAC layer of the protocol stack, the PDU and the truncation indicator; determining, by the MAC layer, whether an uplink transmission size based on an uplink grant is smaller than a first number of bytes included in the PDU; selecting, in response to a determination that the uplink transmission size is smaller than the first number of bytes, a truncation point from the set of truncation points indicated by the truncation indicator; and removing, by the MAC layer, at least a portion of the PDU to generate a truncated PDU having a second number of bytes smaller than the uplink transmission size, where the portion of the PDU being removed is determined at least based on the selected truncation point.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 1A-1B illustrate a wireless system including a user equipment (UE) configured to remove a portion of a packet data unit (PDU) to generate a truncated. PDU for an uplink transmission, according to some aspects of the disclosure.

FIG. 3 illustrates an example process performed by a UE to remove a portion of a PDU to generate a truncated PDU for an uplink transmission, according to some aspects of the disclosure.

Figure 1A:
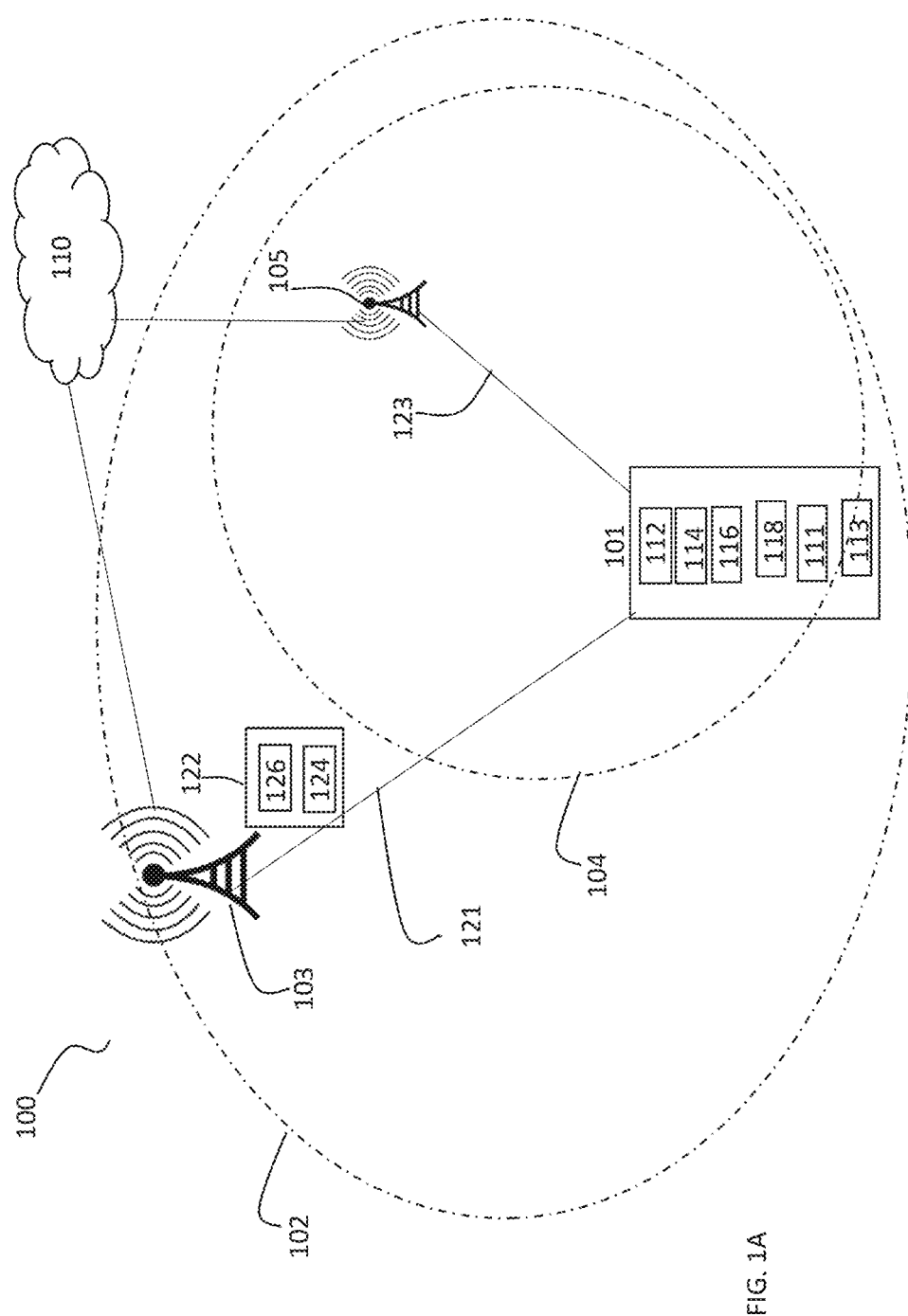

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A user equipment (UE) can generate a packet data unit (PDU) to be transmitted uplink (UL) to a base station of a wireless network. Based on a resource allocation scheme, the UE can receive an uplink grant from a base station, which may indicate an uplink transmission size. When the conditions degrade over a channel between the UE and the base station, due to low downlink (DL) bandwidth, it is possible the radio link control (RLC) layer can generate PDUs with large sizes, e.g., over 8188 octets or more. On the other hand, the UL resource allocations for the UE, as indicated by the UL grant from the base station, can reduce the UL resource allocated in response to the degraded channel condition. When the allocated UL resource does not meet the requirement to transmit the large size PDUs, if the UE is able to send at least a portion of the PDU, the transmitted portion of the PDU can reduce the recovery time for the uplink transmission when the UE enters an area with improved channel conditions. Example use cases may include when the UE comes out of an elevator or network jammed area, where channel conditions suddenly improve.

According to some aspects, in order to send a portion of the PDU, the UE may truncate the PDU in the uplink medium access control (MAC) layer. In some embodiments, a RLC layer can generate a PDU and a truncation indicator, where the truncation indicator can indicate a set of truncation points of the PDU. A MAC layer can determine whether an uplink transmission size based on an uplink grant is smaller than a first number of bytes included in the PDU. In response to a determination that the uplink transmission size is smaller than the first number of bytes, the MAC layer can select a truncation point from the set of truncation points indicated by the truncation indicator, and remove at least a portion of the PDU to generate a truncated PDU having a second number of bytes smaller than the uplink transmission size. The portion of the PDU being removed is determined at least based on the selected truncation point.

According to some aspects, the use of the truncation indicator indicating a set of truncation points of the PDU can provide the flexibility for the MAC layer to select a right size for the truncated PDU. Instead of being any arbitrary byte of the PDU, a truncation point of the set of truncation points can indicate a negatively acknowledged sequence number (NACK-SN). When the RLC layer generates the PDU, it is not known what the uplink transmission size may be granted to the UE, the RLC layer may generate a truncation indicator including multiple truncation points of the PDU so that the MAC layer can dynamically adjust and select the right truncation point based on the allocated uplink transmission size. In some embodiments, the MAC layer can select a truncation point from the set of truncation points resulting in the truncated PDU having a size that is closest to the uplink transmission size among the set of truncation points of the PDU.

According to some aspects, the PDU and the truncation indicator can be generated by the RLC layer, which does not process the PDU in real time. In addition, the selection of the truncation point from the set of truncation points indicated by the truncation indicator can be performed by a MAC layer. The use of the truncation indicator with a proper implementation, such as an array or a bitmap, can reduce the computation during grant processing time processing for the MAC. Even though additional computations are performed by the RLC to generate the truncation indicator, the RLC can be deemed to not have hard deadlines. Overall, the computation of the truncation indicator by the RLC can improve the real time response by MAC and improve the overall performance of the UE in generating the truncated PDU.

According to some aspects, the PDU can be a RLC downlink status PDU. Embodiments herein can be applicable to many different wireless systems, such as a LTE wireless system or a NR wireless system. In some embodiments, the RLC layer can generate the PDU having a size that is smaller the latest uplink grant for specific logical channel to avoid truncations. However, in order to do so, additional communication between the MAC and the RLC is needed so that the RLC can be aware of the uplink transmission size. Hence, such an approach may avoid the truncations of the PDU, but may introduce extra delays and additional communication loads.

According to some aspects, once a PDU, such as a RLC status PDU, is truncated, there is no way to send remaining portion of RLC DL status PDU because if the first segment is lost or segments are delivered out of order, the network may interpret UE has received acknowledged mode (AM) RLC PDUs up to an acknowledged (ACK) sequence number (SN) mentioned in the RLC DL Status PDU segments (for this AMRLC entity). To overcome this issue, the MAC layer may inform the RLC with a truncation offset, the RLC can update receiving (RX)_Highest_Status state variable and regenerates a new status PDU with truncation information. The additional overhead between the MAC and the RLC for RLC DL Status PDU truncation can be eliminated by tracking the RLC status PDUs and its segments assigning Sequence Numbers and Segmentation Info for every segmented RLC status PDU.

FIGS. 1A-1B illustrate a wireless system 100 including a UE, e.g., UE 101, configured to remove a portion of a PDU to generate a truncated PDU for an uplink transmission, according to some aspects of the disclosure. Wireless system 100 is provided for the purpose of illustration only and does not limit the disclosed aspects. Wireless system 100 can include, but is not limited to, UE 101, a base station 103 and a base station 105, all communicatively coupled to a core network 110. UE 101 communicates with base station 103 over a channel 121, and communicates with base station 105 over a channel 123.

In some examples, wireless system 100 can include one or more of a NR system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103 can be an eNB, while base station 105 can be a gNB. In some examples, base station 103 and base station 105 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103, and base station 105 can be communicatively coupled to core network 110. Base station 103 can serve a cell 102, base station 105 can serve a cell 104 contained within cell 102. In some other embodiments, cell 102 can overlap partially with cell 104. Cell 102 and cell 104 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell while cell 104 can be a femto cell. In some examples, the geographic area of a cell can move according to the location of a mobile base station.

According to some aspects, base station 103 can have a downlink transmission 122 that includes a resource allocation, which can include an uplink grant 124 and an uplink transmission size 126. The uplink transmission size 126 can specify the allowed size, e.g., a number of bytes, which can be allowed to be transmitted uplink from UE 101 to base station 103. The uplink transmission size 126 may be determined based on channel conditions for channel 121 or channel 123.

According to some aspects, UE 101 can store a protocol stack that includes various protocol layers, such as a RLC layer 111, a MAC layer 113, and more. UE 101 can receive the downlink transmission 122 and determine the allocated resource for an uplink transmission. RLC layer 111 can generate a PDU 112, and a truncation indicator 114 that indicates a set of truncation points of the PDU, and send PDU 112 and truncation indicator 114 to MAC layer 113.

According to some aspects, there can be many different kinds of PDUs, such as acknowledged mode data (AMD) PDU, unacknowledged mode data (UMD) PDU, RLC data PDU, RLC status PDU, or other PDUs. PDU 112 can include various components. An example PDU 112, which is a RLC status PDU, is shown in FIG. 1B. A status PDU can include negatively acknowledged sequence number (NACK-SN), NACK Range, Segment Offset (SO) fields such as SOstart, SOend. The RLC status PDU payload can start from the first bit following the RLC control PDU header, and it can include one ACK_SN and one E1, zero or more sets of a NACK_SN, an E1, an E2 and an E3, and possibly a pair of a SOstart and a SOend or a NACK range field for each NACK_SN. More details of a RLC status PDU can be found in various technical standards, such as TS 38.322, TS 36.322, and others, which are known to a person having ordinary skill in the arts.

Based on the uplink transmission size 126, the MAC layer 113 can determine whether the uplink transmission size 126 is smaller than a number of bytes included in the PDU 112. When the uplink transmission size 126 is smaller than the number of bytes included in the PDU 112, the MAC layer 113 can select a truncation point from the set of truncation points indicated by the truncation indicator 114, and remove at least a portion of the PDU 112 to generate a truncated PDU 116 having a second number of bytes smaller than the uplink transmission size 126. The portion of the PDU 112 being removed is determined at least based on the selected truncation point. The MAC layer 113 can further update a portion of the truncated PDU 116 to generate an updated truncated PDU 118, and send the updated truncated PDU 118 to the RLC layer 111. RLC layer 111 can further transmit the updated truncated PDU 118 to base station 103.

Figure 2:
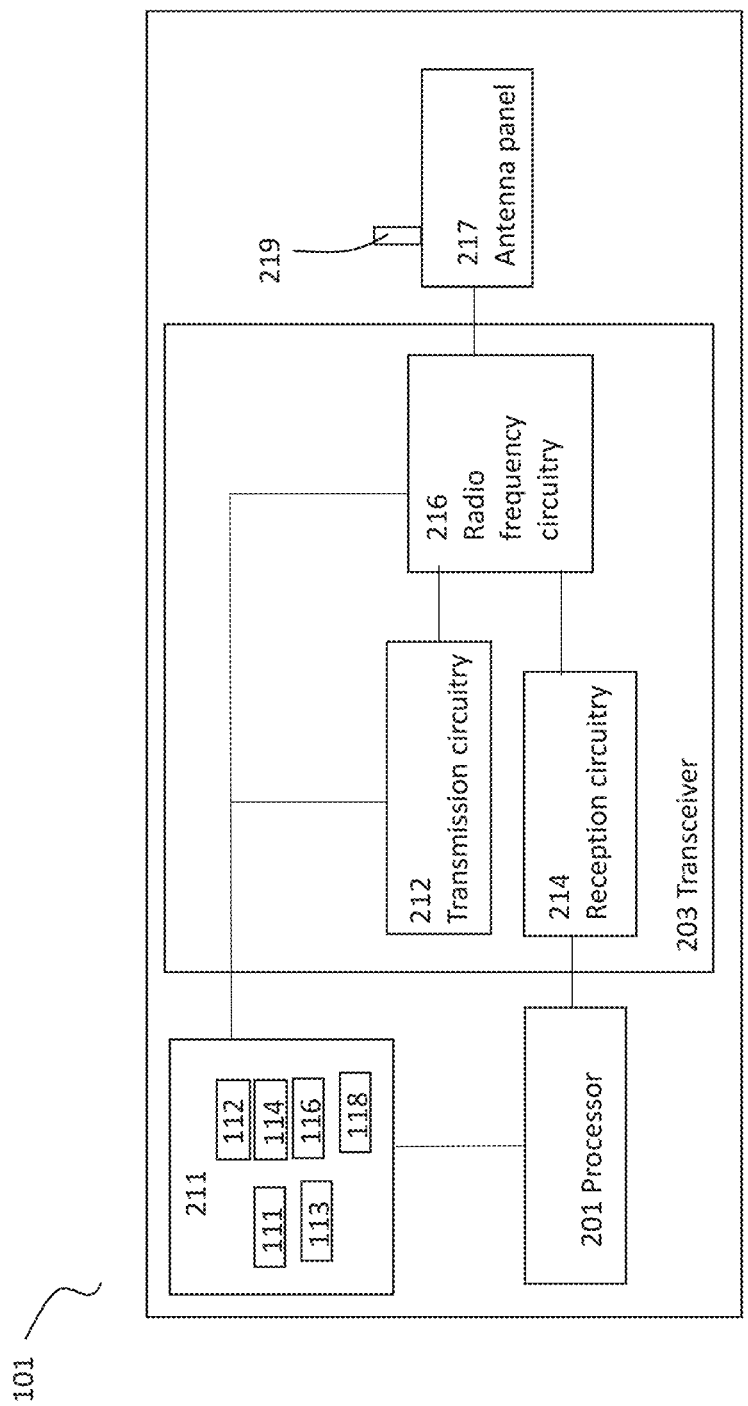
FIG. 2 illustrates a block diagram of a UE to perform functions described herein, according to some aspects of the disclosure.

FIG. 2 illustrates a block diagram of UE 101, having antenna panel 217 including one or more antenna elements, e.g., an antenna element 219 coupled to transceiver 203 and controlled by processor 201. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 201 can be communicatively coupled to memory 211, which is further coupled to transceiver 203.

In some examples, RF circuitry 216 is used by UE 101 to perform measurements of reference signals, and to transmit and receive data in the serving cell. Memory 211 can store PDU 112, truncation indicator 114, truncated PDU 116, and updated truncated PDU 118. In addition, memory 211 can include the protocol stack including various protocols, e.g., RLC layer 111, MAC layer 113, and more. Memory 211 can include instructions, that when executed by processor 201 perform the functions to remove a portion of PDU 112 to generate truncated PDU 116 for an uplink transmission. Alternatively, processor 201 can be "hard-coded" to perform the functions described herein.

According to some aspects, processor 201 can be configured to perform various operations. For example, processor 201 can be configured to generate PDU 112, and truncation indicator 114. Truncation indicator 114 can indicate a set of truncation points of PDU 112. A truncation point of the set of truncation points can indicate a negatively acknowledged sequence number (NACK-SN). PDU 112 and truncation indicator 114 can be generated by a RLC processing path of RLC layer 111. Processor 201 can be configured to send, by RLC layer 111 to MAC layer 113, PDU 112 and truncation indicator 114. Processor 201 can be configured to determine, by MAC layer 113, whether uplink transmission size 126 based on uplink grant 124 is smaller than a first number of bytes included in PDU 112. In response to a determination that the uplink transmission size is smaller than the first number of bytes, processor 201 can be configured to select a truncation point from the set of truncation points indicated by truncation indicator 114. The selection of the truncation point from the set of truncation points can be performed by a MAC layer 113. Processor 201 can be configured to remove at least a portion of PDU 112 to generate truncated PDU 116. The portion of PDU 112 being removed can be determined at least based on the selected truncation point. PDU 112 can include a sequence of ordered bytes, and the removed portion can include consecutive bytes at an end portion of the sequence of ordered bytes. Truncated PDU 116 can have a second number of bytes smaller than uplink transmission size 126. A truncation point from the set of truncation points indicated by truncation indicator 114 is selected so that truncated PDU 116 has a size that is closest to the uplink transmission size 126 among the set of truncation points of PDU 112.

According to some aspects, processor 201 can be configured to update a portion of truncated PDU 116 to generate an updated truncated PDU 118, and send by MAC layer 113 to RLC layer 111, updated truncated PDU 118. Processor 201 can be configured to transmit, by RLC layer 111, updated truncated PDU 118 to a base station 103.

According to some aspects, truncation indicator 114 can be implemented by an array of truncation points, as illustrated in more details by FIGS. 4A-4C and 5A-5B, where an element of the array indicates a byte position associated with a truncation point in the sequence of ordered bytes of PDU 112. In some embodiments, truncation indicator 114 can further include a list of truncation information for an element of the array of truncation points.

According to some aspects, truncation indicator 114 can be implemented by a bitmap having a first number of bits, where a bit of the bitmap corresponds to a byte of the PDU, as illustrated in more details by FIGS. 6A-6B and 7A-7B. Each bit of the bitmap can have a value 0 or a value 1. In some embodiments, the bitmap can be a first bitmap, and truncation indicator 114 can further include a second bitmap having the first number of bits, where a bit of the second bitmap corresponds to a byte of the PDU, as illustrated in more details by FIGS. 7A-7B. The truncation point selected from the set of truncation points can be determined by the first bitmap and the second bitmap. In some embodiments, truncation indicator 114 can further include a list of truncation information for a bit of value 1 in the bitmap, as illustrated in more details by FIGS. 4C, 5B, and 6B.

FIG. 3 illustrates an example process 300 performed by a UE to remove a portion of a PDU to generate a truncated PDU for an uplink transmission, according to some aspects of the disclosure. Process 300 can be performed by UE 101 as shown in FIG. 1A or 2.

At 301, a RLC layer of a protocol stack of the UE can generate a PDU, and a truncation indicator, where the truncation indicator indicates a set of truncation points of the PDU. For example, as shown in FIG. 1, RLC layer 111 of a protocol stack of UE 101 can generate PDU 112, and truncation indicator 114, where the truncation indicator 114 indicates a set of truncation points of PDU 112.

At 302, the RLC layer can send the PDU and the truncation indicator to a MAC layer of the protocol stack. For example, RLC layer 111 can send PDU 112 and truncation indicator 114 to MAC layer 113.

At 303, the MAC layer can compare an uplink transmission size to the PDU size to determine whether the uplink transmission size based on an uplink grant is smaller than a first number of bytes included in the PDU. For example, MAC layer 113 can determine whether an uplink transmission size 126 based on an uplink grant 124 is smaller than a first number of bytes included in PDU 112.

At 304, in response to a determination that the uplink transmission size is smaller than the first number of bytes, the MAC layer can select a truncation point from the set of truncation points indicated by the truncation indicator. For example, MAC layer 113 can select a truncation point from the set of truncation points indicated by truncation indicator 114.

At 305, the MAC layer can remove at least a portion of the PDU to generate a truncated PDU having a second number of bytes smaller than the uplink transmission size, where the portion of the PDU being removed is determined at least based on the selected truncation point. For example, MAC layer 113 can remove at least a portion of PDU 112 to generate truncated PDU 116 having a second number of bytes smaller than the uplink transmission size, where the portion of PDU 112 being removed is determined at least based on the selected truncation point.

At 306, the MAC layer can update a portion of the truncated PDU to generate an updated truncated PDU. For example, MAC layer 113 can update a portion of truncated PDU 116 to generate updated truncated PDU 118. Truncated PDU 116 is obtained by removing a portion of PDU 112, and truncated PDU 116 is the remaining portion of PDU 112. Updated truncated PDU 118 is obtained by update a portion of truncated PDU 116, not the original PDU 112.

At 307, the MAC layer can send the updated truncated PDU to the RLC layer. For example, MAC layer 113 can send updated truncated PDU 118 to RLC layer 111.

At 308, the RLC layer can transmit the updated truncated PDU to a base station of the wireless network. For example, RLC layer 111 can transmit updated truncated PDU 118 to base station 103. MAC layer 113 can transmit the truncated RLC status PDU and indicate truncation status to RLC, which will adjust state variables (RX_Highest_Status).

Process 300 can be implemented with more details as processes 400, 500, 600, or 700 as shown in FIGS. 4A-4C, 5A-5B, 6A-6B, and 7A-7B. There are some additional operations in FIGS. 4A-4C, 5A-5B, 6A-6B, and 7A-7B that are not shown in FIG. 3. Similarly, there are some operations in FIG. 3 not shown in some of the FIGS. 4A-4C, 5A-5B, 6A-6B, and 7A-7B. A person having the ordinary skill in the art can select the operations to be implemented according the processes shown for a specific application.

Processes 400, 500, 600, or 700 can share many operations in common, and they can differ in the details of the implementation of the truncation indicator at operations for 301. Depending on the implementation of the truncation indicator at 301, the operations for 304, 305, and 306 can be different too. In the description below, more details are provided for operations performed at 304, 305, and 306, which together can form a process 310.

Figure 4A:
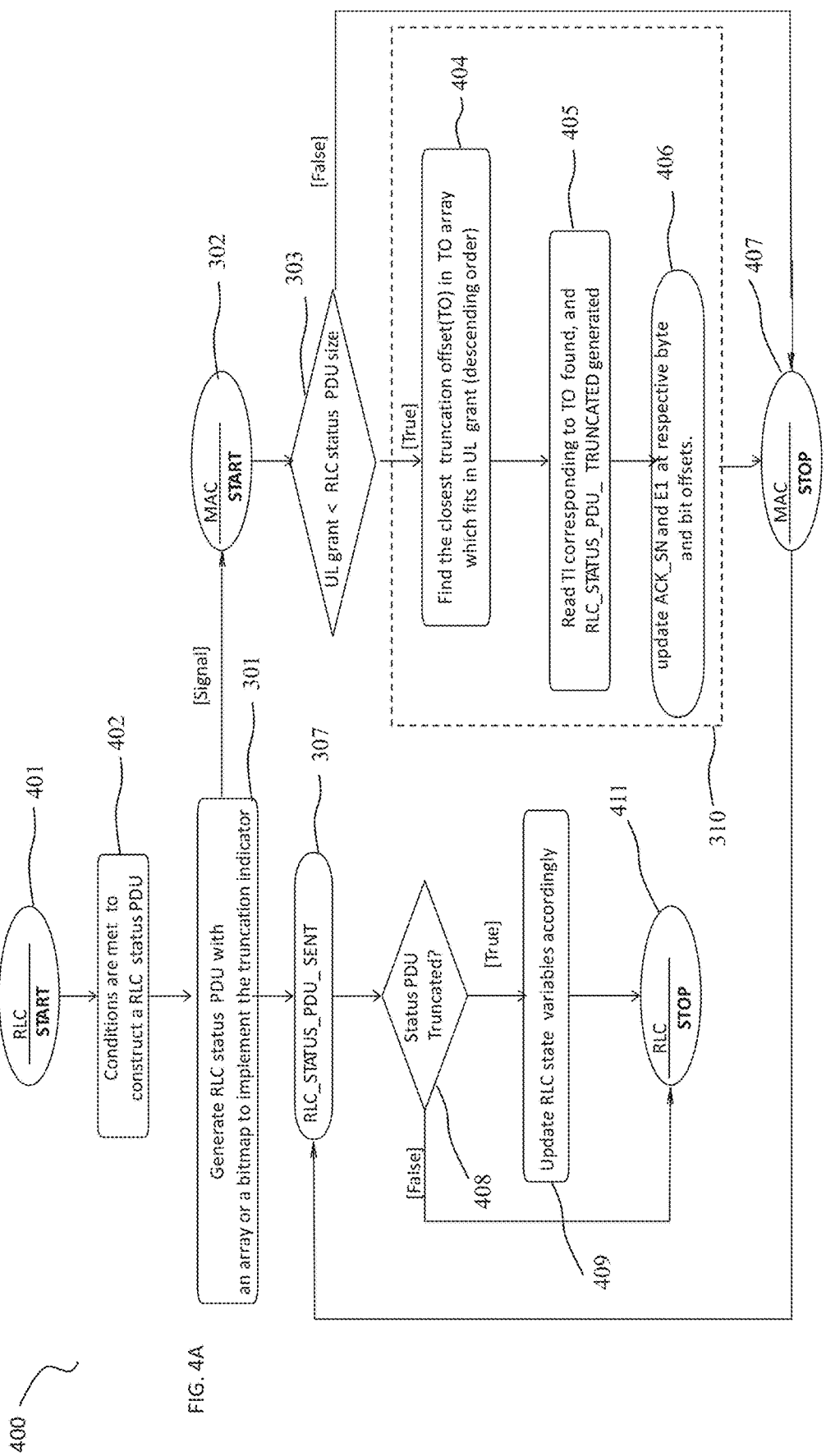
FIGS. 4A-4C illustrate an additional example process performed by a UE to remove a portion of a PDU to generate a truncated PDU for an uplink transmission, according to some aspects of the disclosure.
Figure 4B:
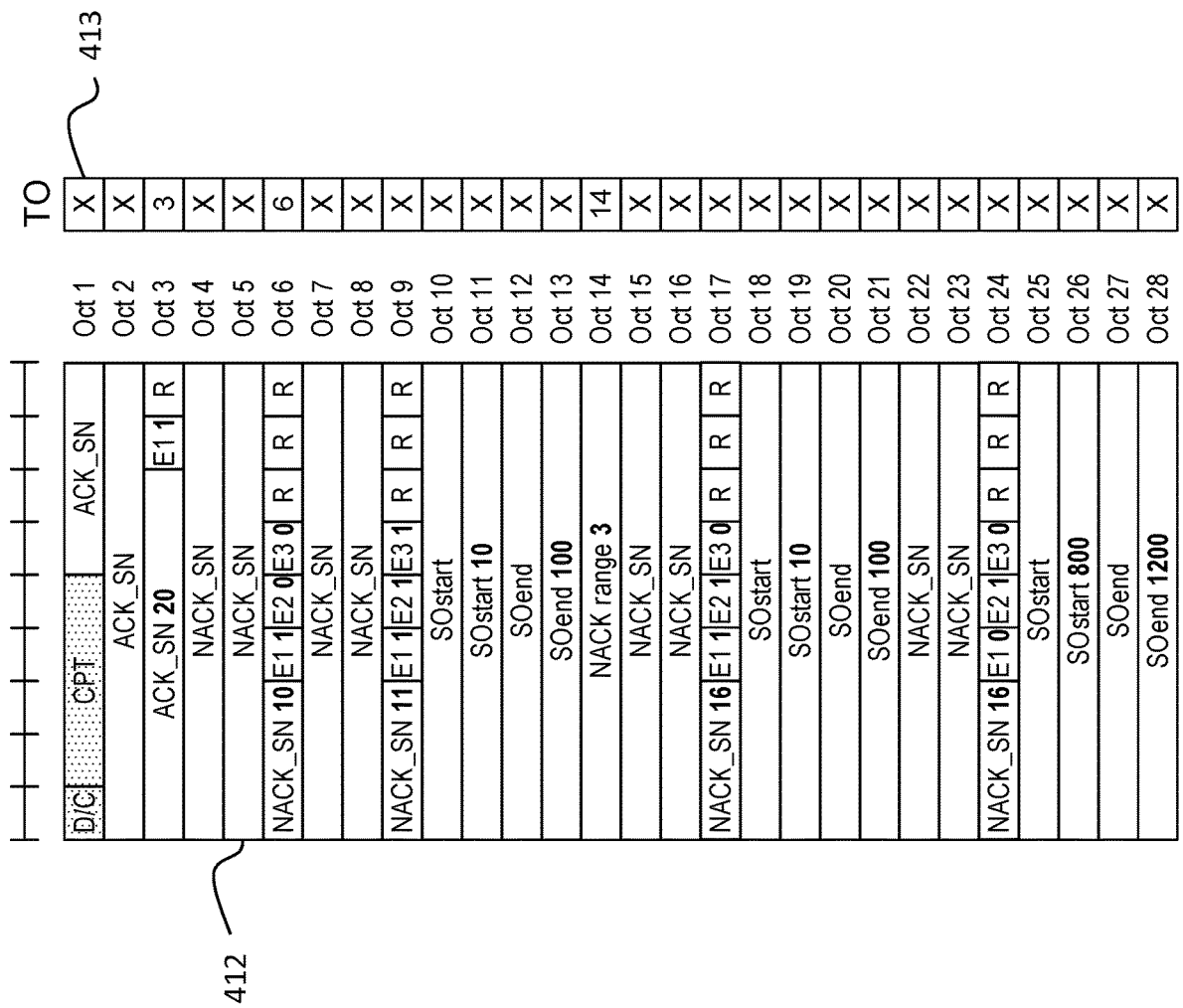
Figure 4C:
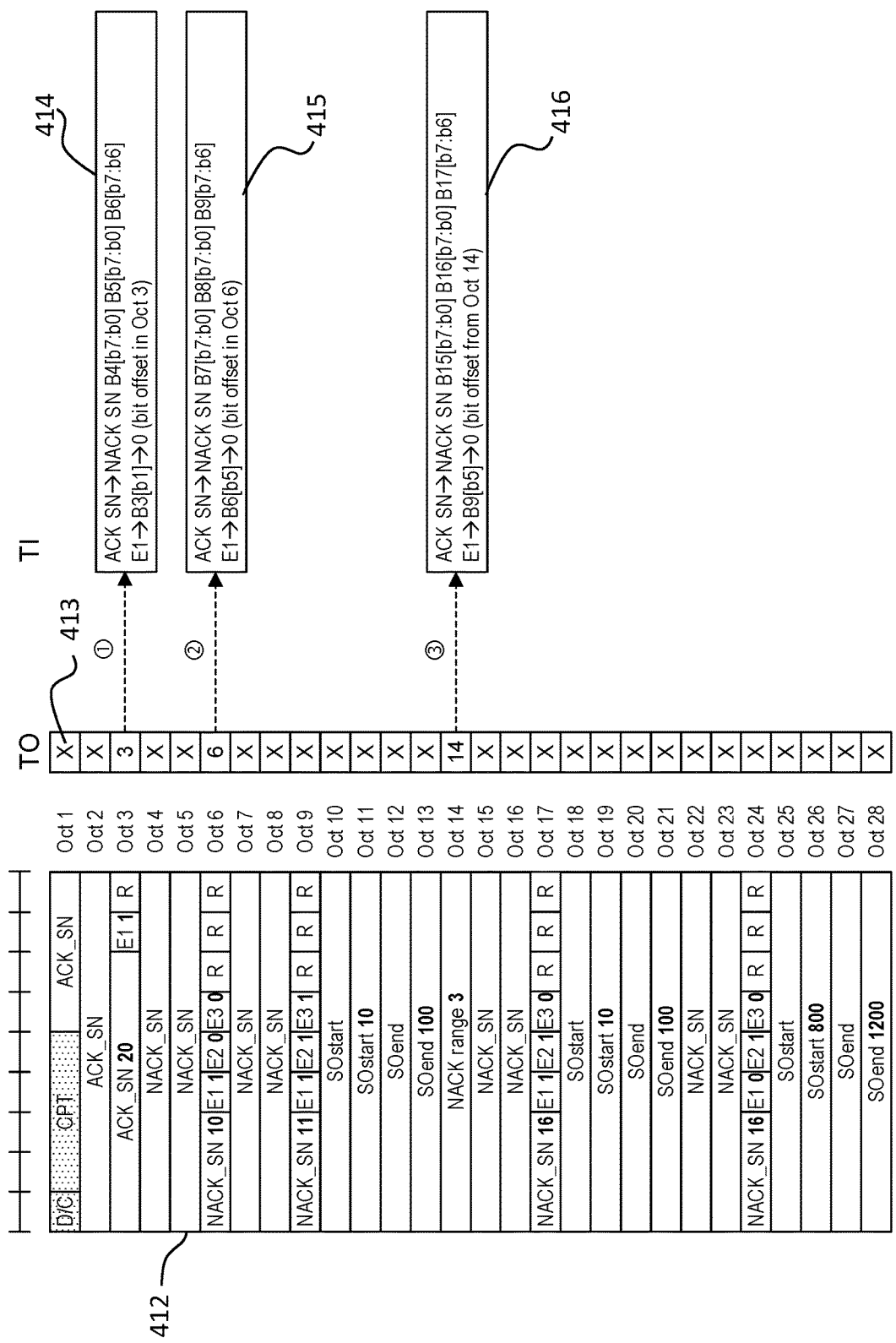

FIGS. 4A-4C illustrate an additional example process 400 performed by UE 101 to remove a portion of a PDU to generate a truncated PDU for an uplink transmission, according to some aspects of the disclosure. Process 400 can be an example of process 300 with more details. In some embodiments, UE 101 can remove a portion of a PDU based on a selected truncation point indicated by a truncation indicator, where the truncation indicator is implemented by an array of truncation points or a bitmap. For process 400, the PDU 112 is a RLC status PDU, as shown in FIG. 1B, which includes fields such as NACK-SN, SN, SOstart, SOend, E1, E2, E3, and more. A RLC status PDU can be referred to as a RLC DL status PDU as well. Process 400 can be applicable to other PDUs as well.

Process 400 starts at 401. At 401, the RLC can start the operation. At 402, the RLC can test whether the conditions are met to construct a RLC status PINT. Afterwards, process 400 enters operations illustrated in process 300.

At 301, the RLC layer can generate a RLC status PDU, and a truncation indicator, where the truncation indicator indicates a set of truncation points of the PDU. The truncation indicator can be implemented by one or more arrays, one or more bitmaps, one or more lists, or some other data structures. As shown in FIG. 4B, the truncation indicator can be implemented by an array of truncation points, a truncation offset (TO) array, and an element of the array indicates a byte position associated with a truncation point (TP) in the sequence of ordered bytes of the PDU. As shown in FIG. 4C, the truncation indicator can be implemented by an array, in addition to a list of truncation information (TI) for an element of the array of truncation points. Output of operations performed at 301 can be provided to operations performed at 302 and operations performed at 307.

At 302, the RLC layer can send the MU and the truncation indicator to a MAC layer. At 303, the MAC layer can compare an uplink transmission size to the PDU size to determine whether an uplink transmission size based on an uplink grant is smaller than a first number of bytes included in the PDU.

At 404, in response to a determination that the uplink transmission size is smaller than the first number of bytes, the MAC layer can select a truncation point from the set of truncation points indicated by the truncation indicator. In some embodiments, the MAC layer can find the closest TO in the TO array which fits in the uplink transmission size. The PDU can include a sequence of ordered bytes, and the MAC layer can find the closest TO in the TO array in a descending order according to the sequence of ordered bytes in the PDU.

At 405, the MAC layer can remove at least a portion of the PDU to generate a truncated PDU having a second number of bytes smaller than the uplink transmission size, where the portion of the PDU being removed is determined at least based on the selected truncation point. In some embodiments, the MAC layer can read the truncation information (TI) corresponding to the TO found in the TO array, and generate the truncated status PDU.

At 406, the MAC layer can update a portion of the truncated. PDU to generate an updated truncated PDU. Operations performed at 404, 405, and 406 implement process 310 as shown in FIG. 3. Operations implementing process 310 stops at 407, and operation results are passed to operations at 307.

At 307, the MAC layer can send the updated truncated PDU to the RLC layer. Afterwards, process 400 continues on the RLC layer. At 408, the RLC layer can determine whether the PDU has been truncated. If determined that the PDU has been truncated, at 409, the RLC layer can update the RLC state variables accordingly. The RLC layer can also transmit the updated truncated PDU to a base station of the wireless network. At 411, the RLC stops operation.

As shown in FIG. 4B, the RLC provides the TO array 413 for a RLC status PDU 412, where PDU 412 is an embodiment of PDU 112. The size of TO array 413 is determined by number of bits required for max RLC status PDU size multiplied with a number of TO entries. In some examples, a RLC status PDU size is 9000 bytes, where a byte can have an address of 15 bits. The TO array size can be 15 times TO entries in bits, where each entry of the TO array is a binary address of the bytes in the PDU. For each valid truncation point in the RLC status PDU 412, the RLC may add a TO entry in the TO array 413. For example, a TO entry can be added after every 'N' NACK SN blocks based on the RLC status PDU 412. TO array 413 has 3 entries corresponding to octet 3, octet 6, and octet 14. The TO array 413 helps the MAC layer to find valid truncation points set by the RLC.

In some embodiments, when using TO array 413 to implement the truncation indicator, no changes is required from the RLC. Truncation points are determined in RLC per "N" NACK SN blocks. On the other hand, additional computation in the MAC may be used to determine valid NACK_SN to update ACK_SN in first 3 octets of RLC status PDU. Fixed number of truncation points determined by the RLC based on RLC DL status PDU size.

As shown in FIG. 4C, the RLC provides the TO array 413. In addition, the RLC also provides a truncation info (TI) array, which includes ACK-SN value and E1 bit offset to modify from a current TP. TI array includes element 414, element 415, and element 416, corresponding to the 3 entries of the TO array 413.

In some embodiments, the TO array 413 can be implemented in memory accessible by the MAC layer, and the TI array can be stored in a double data rate (DDR) synchronous dynamic random access memory (SDRAM) device. In some embodiments, minor changes are required from the RLC for additional TI array which includes ACK_SN and E1 bit offset to update. The RLC determines truncation points and TI, no additional processing required by the MAC layer to find the truncation points and NACK SN to update ACK SN.

Figure 5A:
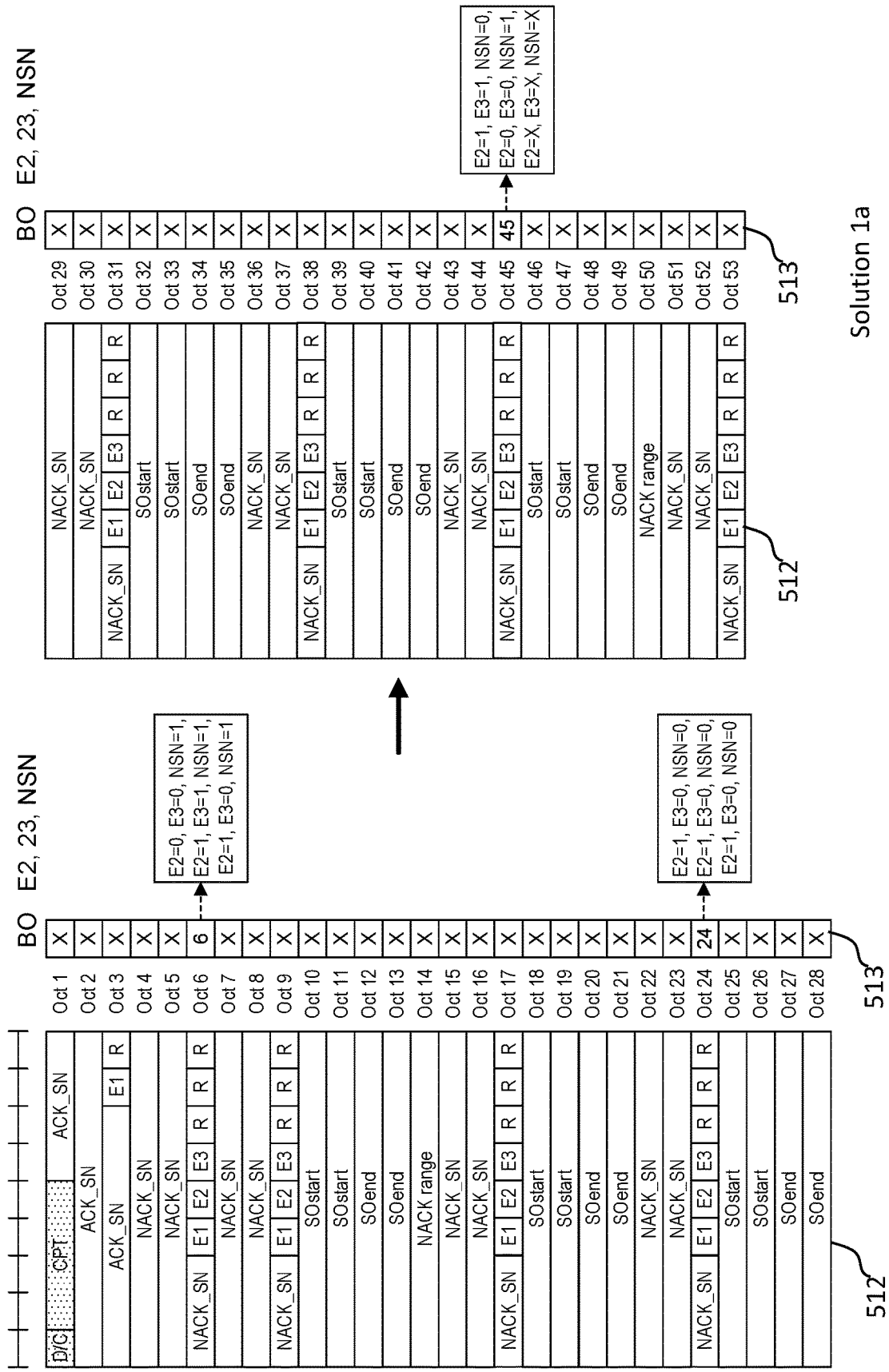
FIG. 5A-5B illustrate an additional example process performed by a UE to remove a portion of a PDU to generate a truncated PDU for an uplink transmission, according to some aspects of the disclosure.
Figure 5B:
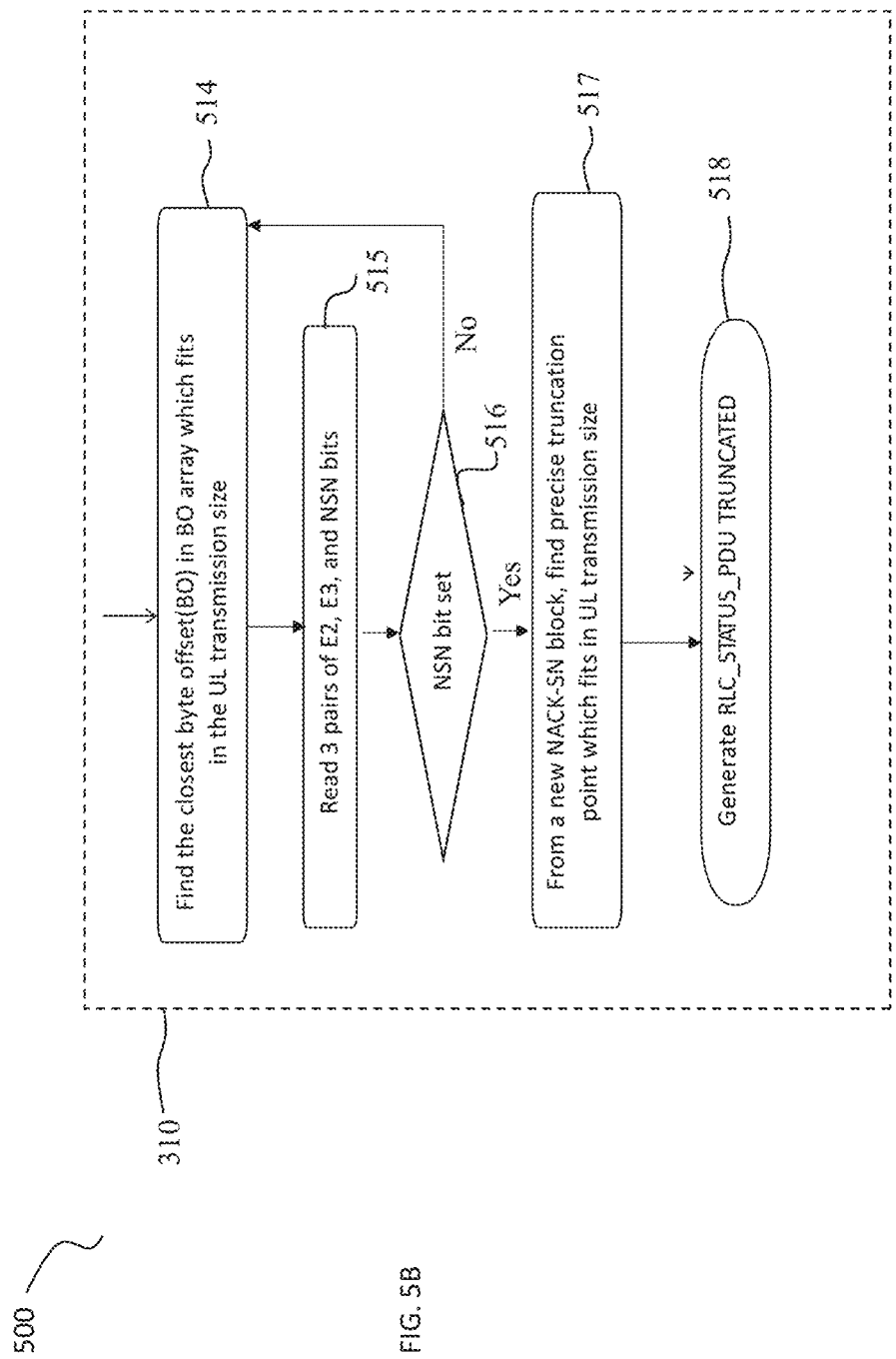

FIGS. 5A-5B illustrate an additional example process 500 performed by UE 101 to remove a portion of a PDU to generate a truncated PDU for an uplink transmission, according to some aspects of the disclosure. Process 500 can be an example of process 300 with more details.

In some embodiments, UE 101 can remove a portion of a PDU based on a selected truncation point indicated by a truncation indicator, wherein the truncation indicator is implemented by a byte offset (BO) array to indicate the truncation points. As shown in FIG. 5A, a RLS status PDU 512 can have 53 octets. A byte offset (BO) array 513 can be used to represent a set of truncation points. As shown, BO array 513 can contain 3 elements, corresponding to 3 truncation points at octet 6, octet 24, and octet 45. An element of BO array 513 can include E2, E3, NSN bits. The truncation of RLC status PDU 512 can be completely handled by the MAC layer with the help of E2, E3, NSN bits.

In some embodiments, as shown in FIG. 5B, process 500 can further describe the process 310 of FIG. 4A, which is implemented by operations performed at 514, 515, 516, 504, and 505, which are described below in details.

At 514, the MAC layer can find the closest byte offset (BO) in BO array which fits in the UL transmission size. At 515, the MAC layer can read 3 pairs of E2, E3, and NSN bits. At 516, the MAC layer can test whether NSN bit is set or not. When the NSN bit is not set, the MAC layer can loop hack to operations at 514. When the NSN hit is set, at 517, the MAC layer can find a precise truncation point from a new NACK-SN block that fits to the UL transmission size. In some examples, at SOend, the MAC layer can update E3, E1 bits for the current NACK SN block and update ACK_SN with NACK SN or with following new NACK SN. At NACK range, the MAC layer can update E1 bit for the current NACK SN block and update ACK_SN with following new NACK SN. At new NACK SN block, the MAC layer can update E1 bit for previous NACK SN block and update ACK_SN with current NACK SN. At 518, the MAC layer can generate the truncated PDU, e.g., RLC_STATUS_PDU TRUNCATED.

Figure 6A:
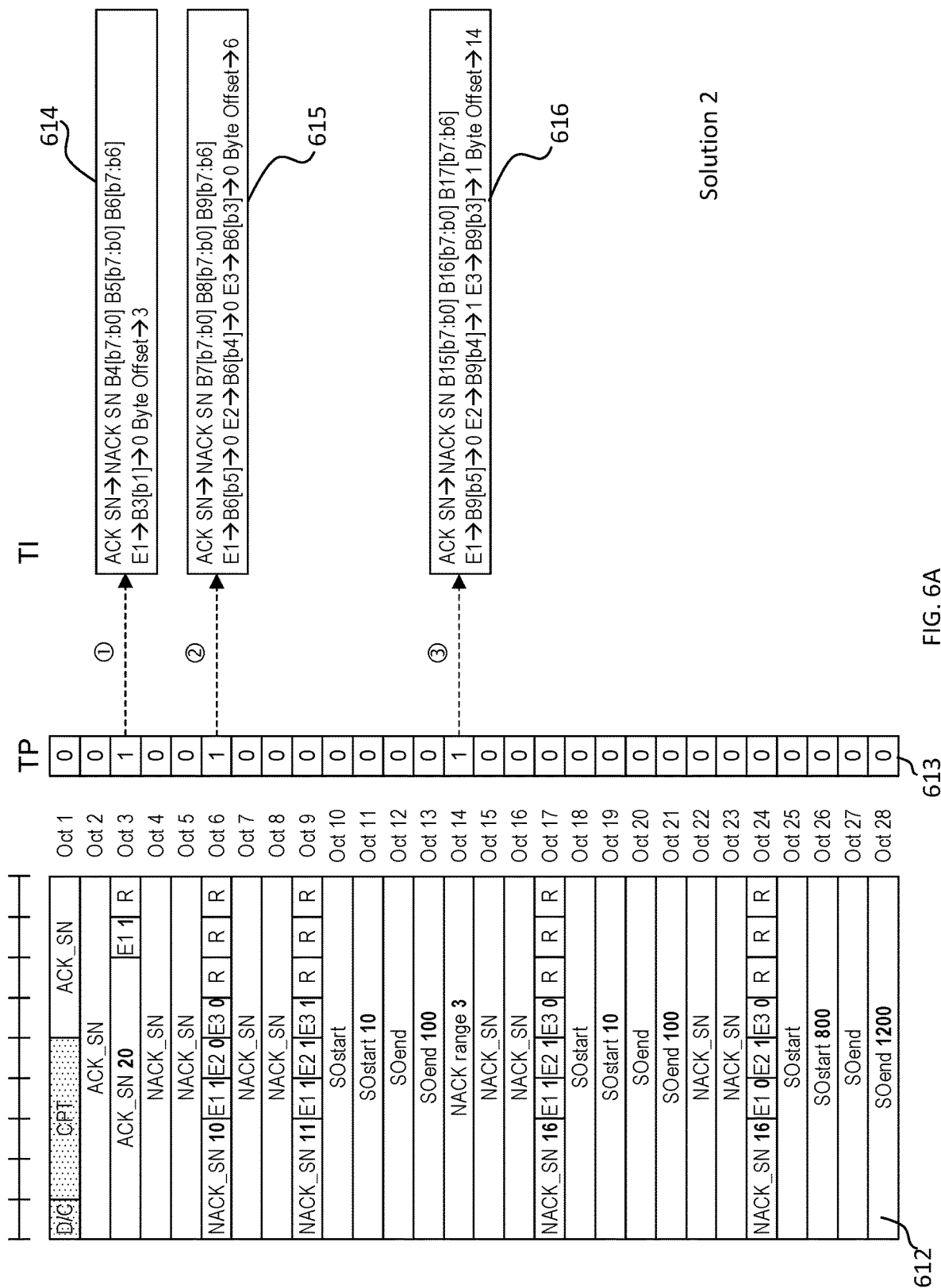
FIG. 6A-6B illustrate an additional example process performed by a UE to remove a portion of a PDU to generate a truncated PDU for an uplink transmission, according to some aspects of the disclosure.
Figure 6B:
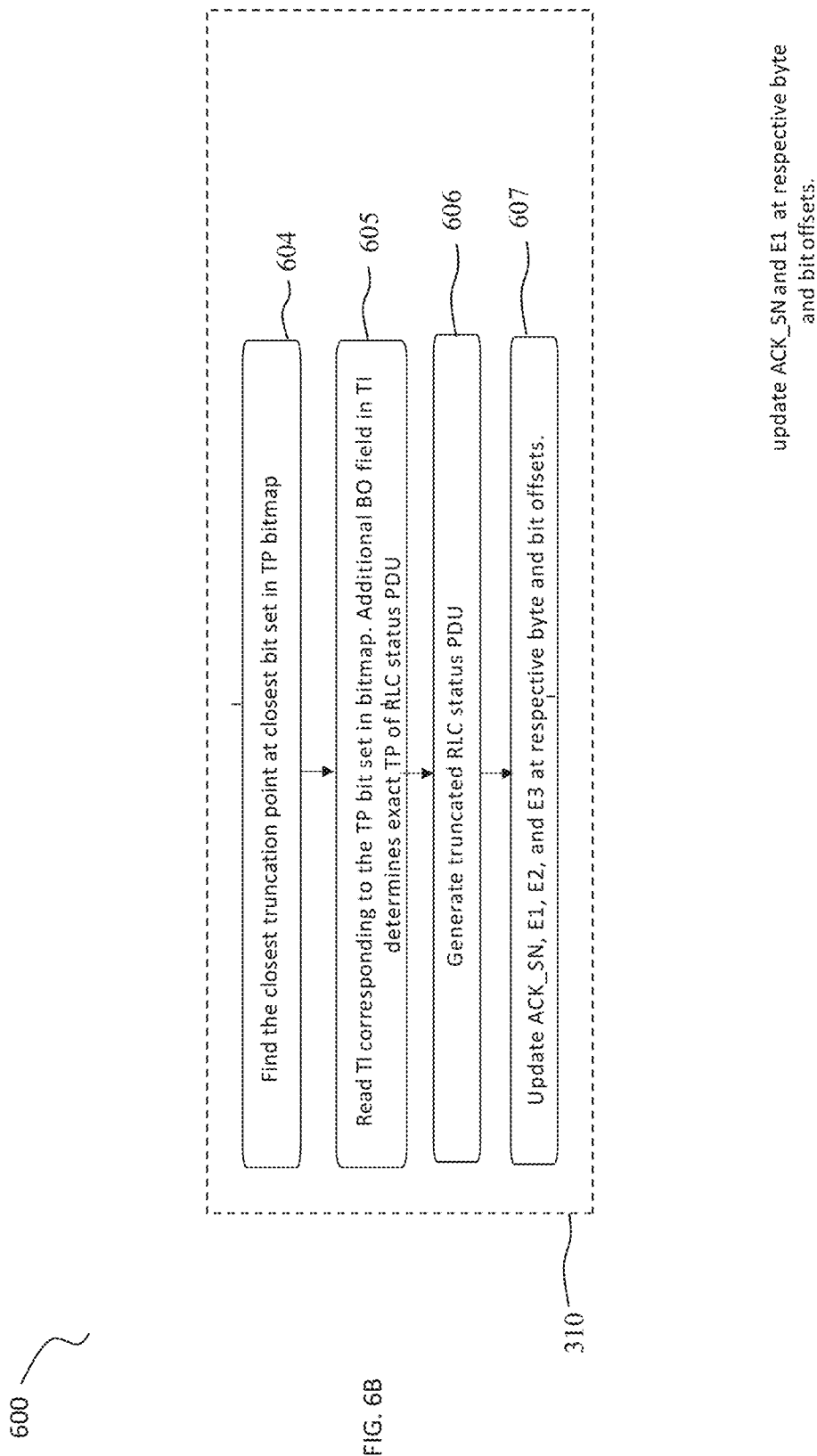

FIGS. 6A-6B illustrate an additional example process 600 performed by UE 101 to remove a portion of a PDU to generate a truncated PDU for an uplink transmission, according to some aspects of the disclosure. Process 500 can be an example of process 300 with more details.

In some embodiments, as shown in FIG. 6A, UE 101 can remove a portion of a PDU 612 based on a selected truncation point indicated by a truncation indicator, wherein the truncation indicator is implemented by a truncation points (TP) bitmap 613. The RLC provides the bitmap 613 equal to size of the RIX status PDU 612 in bits. For example, when the RLC status PDU size is 9000 bytes, the bitmap 613 has a size of 1125 Bytes. The TP bitmap 613 can help the MAC layer find a valid TP determined by the RLC. The bitmap 613 further includes a truncation information (TI) array with one or more elements, with an element corresponding to a bit set to value 1. For example, TI array element 614 corresponds to the bit position 3 having a value 1, TI array element 615 corresponds to the bit position 6 having a value 1, and TI array element 616 corresponds to the bit position 14 having a value 1. The array element 613, array element 614, and array element 615 can include values of ACK_SN value, E1, E2, and E3 bit offset to modify from the current truncation point and optional byte offset for the MAC layer to truncate the RIX status PDU.

In some embodiments, as shown in FIG. 6B, process 600 can further describe process 310 in FIG. 4A, which is implemented by operations performed at 604, 605, 615, and 606, described below.

At 604, the MAC layer can find the closest truncation point at closest bit set in TP bitmap which fits in the UL transmission size. At 605, the MAC layer can read TI corresponding to the TP bit set in bitmap. Additional BO field in TI determines exact TP of the RLC status PDU. At 606, the MAC layer can generate the truncated PDU, e.g., RLC_STATUS_PDU TRUNCATED. At 607, the MAC layer can update ACK_SN, E1, E2, and E3 at respective byte and bit offsets.

In embodiments, only limited processing is performed at the MAC layer for truncation of the RLC status PDU to find the lower truncation point from the grant size allocated for the RLC status PDU. The MAC layer can further modify RLC status PDU from truncation information, such as ACK_SN, E1, E2, and E3 at respective byte and bit offsets.

Figure 7A:
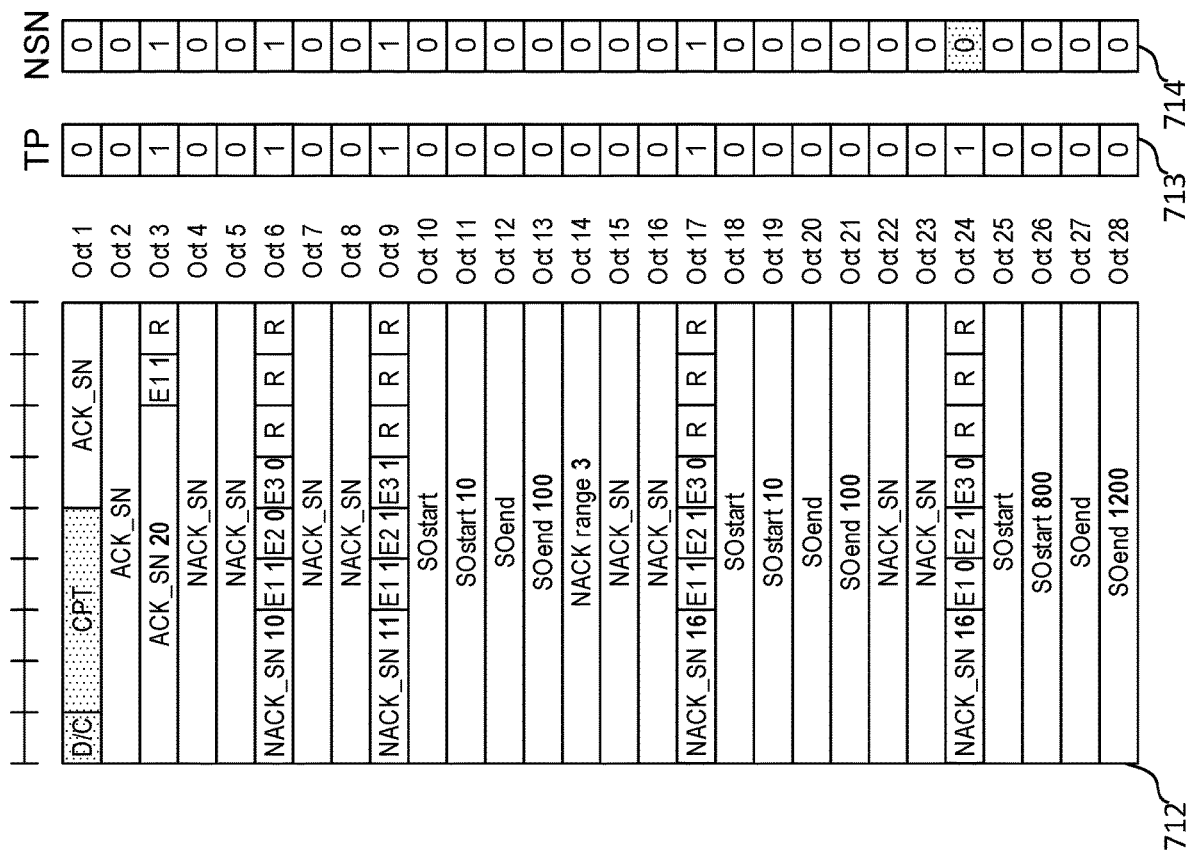
FIG. 7A-7B illustrate an additional example process performed by a UE to remove a portion of a PDU to generate a truncated PDU for an uplink transmission, according to some aspects of the disclosure.
Figure 7B:
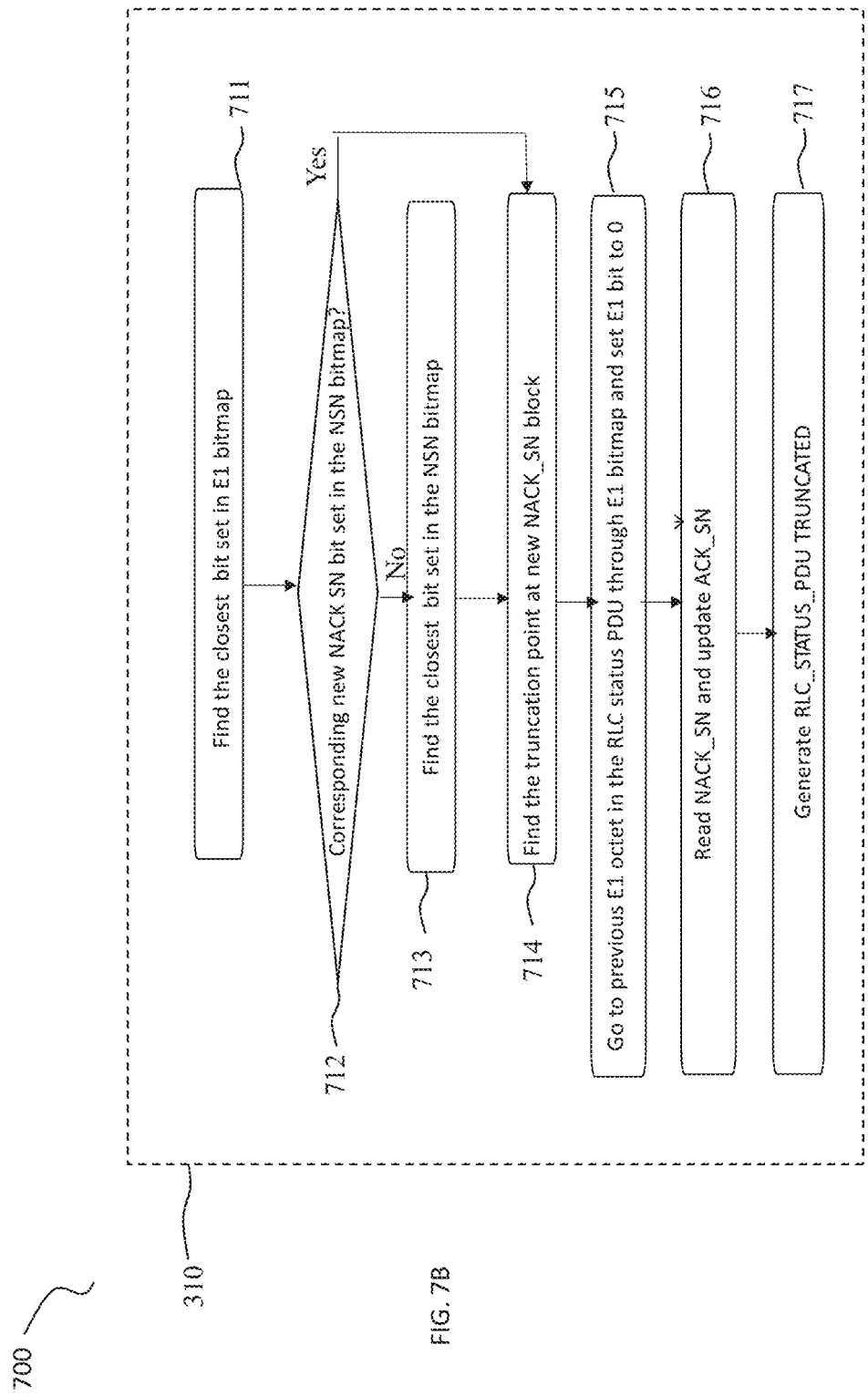

FIGS. 7A-7B illustrate an additional example process 700 performed by UE 101 to remove a portion of a PDU to generate a truncated PDU for an uplink transmission, according to some aspects of the disclosure. Process 700 can be an example of process 300 with more details.

In some embodiments, as shown in FIG. 7A, UE 101 can remove a portion of a PDU 712 based on a selected truncation point indicated by a truncation indicator, where the truncation indicator is implemented a bitmap 713 and a bitmap 714. The RLC provides the bitmap 713 and the bitmap 714 having a size equal to a size of the RLC status PDU 712 in bits. Bitmap 713 is an E1 bitmap. For each E1 bit set in the RLC status PDU octet, the corresponding bit of the bitmap 713 can be set as shown in FIG. 7A. Bitmap 714 is a NSN bitmap. For every new NACK_SN encoded in the RLC status PDU octet, the corresponding bit in the NSN bitmap can be set to 1. For example, a bit can be set to 1 for consecutive NACK_SN in the RLC status PDU 712. Both bitmap 713 and bitmap 714 can be generated by the RLC and saved in the MAC layer accessible memory.

In some embodiments, as shown in FIG. 7B, process 700 can further describe process 310 which is implemented by operations performed at 711, 712, 713, 714, 715, 716, and 717, described below.

At 711, the MAC layer can find the closest bit set in E1 bitmap. At 712, the MAC layer can test the corresponding new NACK SN bit set in the NSN bitmap or not. When the test result is No, at 713, the MAC layer can find the closest bit set in the NSN bitmap. At 714, the MAC layer can find the truncation point at new NACK_SN block. At 715, the MAC layer can go to previous E1 octet in the RLC status PDU through E1 bitmap and set E1 bit to 0. At 716, the MAC layer can read NACK_SN and update ACK_SN. At 717, the MAC layer can generate RLC_STATUS_PDU TRUNCATED.

Figure 8:
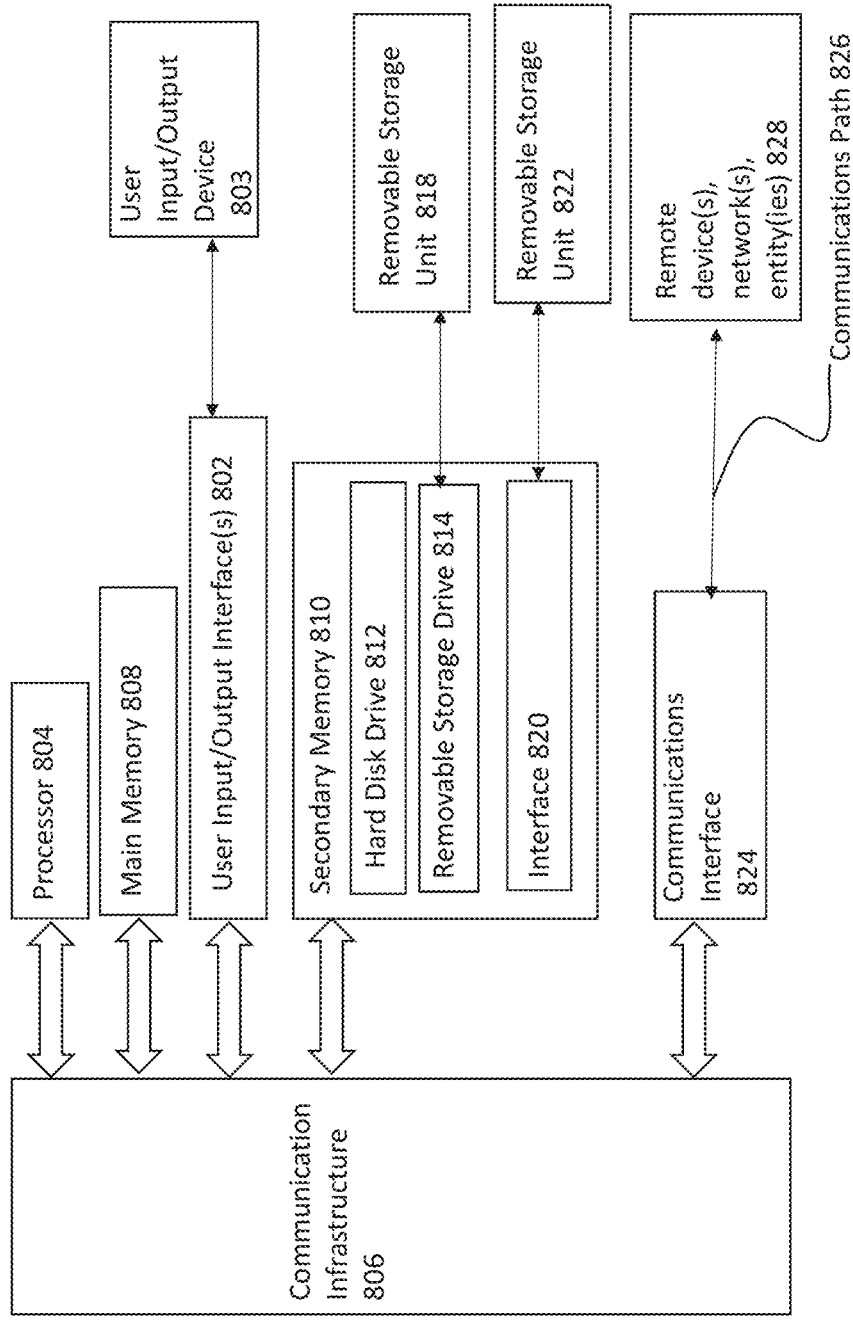
FIG. 8 is an example computer system for implementing some aspects or portion(s) thereof of the disclosure provided herein.

Various aspects can be implemented, for example, using one or more computer systems, such as computer system 800 shown in FIG. 8. Computer system 800 can be any computer capable of performing the functions described herein such as UE 101, base station 103, or base station 105 as shown in FIG. 1A and FIG. 2. Computer system 800 includes one or more processors (also called central processing units, or CPUs), such as a processor 804. Processor 804 is connected to a communication infrastructure 806 (e.g., a bus). Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 808, the removable storage unit 818, the removable storage unit 822 can store instructions that, when executed by processor 804, cause processor 804 to perform operations for a UE or a base station, e.g., UE 101, base station 103, or base station 105, as shown in FIG. 1A and FIG. 2. In some examples, the operations include those operations illustrated and described in FIGS. 3, 4A-4C, 5A-5B, 6A-6B, and 7A-7B.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826. Operations of the communication interface 824 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for wireless communications by a user equipment (UE) in a wireless network, comprising:
   generating, by a radio link control (RLC) layer of a protocol stack of the UE, a packet data unit (PDU) and a truncation indicator, wherein the truncation indicator indicates a set of truncation points of the PDU generated by the RLC layer of the UE, wherein the truncation indicator is implemented as a data structure comprising a bitmap or an array that is distinct from the PDU and the bitmap or the array having a length determined based on a number of bytes of the PDU, and an element of the bitmap or the array indicates a byte position associated with a truncation point within the bytes of the PDU;
   sending, by the RLC layer to a medium access control (MAC) layer of the protocol stack, the PDU and the truncation indicator;
   determining, by the MAC layer, whether an uplink transmission size based on an uplink grant is smaller than a first number of bytes included in the PDU;
   selecting, in response to a determination that the uplink transmission size is smaller than the first number of bytes, a truncation point from the set of truncation points indicated by the truncation indicator; and
   removing, by the MAC layer, at least a portion of the PDU to generate a truncated PDU having a second number of bytes smaller than the uplink transmission size, wherein the portion of the PDU being removed is determined at least based on the selected truncation point.

2. The method of claim 1, further comprising:
   updating, by the MAC layer, a portion of the truncated PDU to generate an updated truncated PDU;
   sending, by the MAC layer to the RLC layer, the updated truncated PDU;
   transmitting, by the RLC layer, the updated truncated PDU to a base station of the wireless network; and
   forming, by the RLC layer, a next RLC status PDU to be transmitted to the base station.

3. The method of claim 1, wherein a truncation point of the set of truncation points indicates a negatively acknowledged sequence number (NACK-SN) block.

4. The method of claim 1, wherein the selecting the truncation point comprises selecting the truncation point from the set of truncation points resulting in the truncated PDU having a size that is closest to the uplink transmission size among the set of truncation points of the PDU.

5. The method of claim 1, wherein the PDU includes a sequence of ordered bytes, and the portion of the PDU being removed includes consecutive bytes at an end portion of the sequence of ordered bytes.

6. The method of claim 5, wherein the data structure is implemented by an array of truncation points, and an element of the array indicates a byte position associated with a truncation point in the sequence of ordered bytes.

7. The method of claim 6, wherein the data structure further includes a list of truncation information for an element of the array of truncation points.

8. The method of claim 5, wherein the data structure is implemented by a bitmap having a first number of bits, wherein a bit of the bitmap corresponds to a byte of the PDU, the bit is of a value 0 or a value 1.

9. The method of claim 8, wherein the bitmap is a first bitmap, and the data structure further includes a second bitmap having the first number of bits, wherein a bit of the second bitmap corresponds to a byte of the PDU, the bit is of a value 0 or a value 1, and wherein the truncation point selected from the set of truncation points is determined by the first bitmap and the second bitmap.

10. The method of claim 8, wherein the data structure further includes a list of truncation information for a bit of value 1 in the bitmap.

11. The method of claim 1, wherein the PDU and the truncation indicator are generated by the RLC layer, and the selecting of the truncation point from the set of truncation points is performed by the MAC layer.

12. A user equipment (UE), comprising:
a transceiver configured to enable wireless communication in a wireless network;
a memory that stores a protocol stack of the UE, wherein the protocol stack includes at least a radio link control (RLC) layer and a medium access control (MAC) layer; and
a processor, communicatively coupled to the transceiver and the memory, configured to:
generate, by the RLC layer, a packet data unit (PDU) and a truncation indicator, wherein the truncation indicator indicates a set of truncation points of the PDU generated by the RLC layer of the UE, wherein the truncation indicator is implemented as a data structure comprising a bitmap or an array that is distinct from the PDU and the bitmap or the array having a length determined based on a number of bytes of the PDU, and an element of the bitmap or the array indicates a byte position associated with a truncation point within the bytes of the PDU;
send, by the RLC layer to the MAC layer, the PDU and the truncation indicator;
determine, by the MAC layer, whether an uplink transmission size based on an uplink grant is smaller than a first number of bytes included in the PDU;
select, in response to a determination that the uplink transmission size is smaller than the first number of bytes, a truncation point from the set of truncation points indicated by the truncation indicator; and
remove, by the MAC layer, at least a portion of the PDU to generate a truncated PDU having a second number of bytes smaller than the uplink transmission size, wherein the portion of the PDU being removed is determined at least based on the selected truncation point.

13. The UE of claim 12, wherein the processor is further configured to:
update, by the MAC layer, a portion of the truncated PDU to generate an updated truncated PDU;
send, by the MAC layer to the RLC layer, the updated truncated PDU; and
transmit, by the RLC layer, the updated truncated PDU to a base station of the wireless network.

14. The UE of claim 12, wherein the processor is further configured to select the truncation point from the set of truncation points resulting in the truncated PDU having a size that is closest to the uplink transmission size among the set of truncation points of the PDU.

15. The UE of claim 12, wherein the PDU includes a sequence of ordered bytes, and the portion of the PDU being removed includes consecutive bytes at an end portion of the sequence of ordered bytes.

16. The UE of claim 15, wherein the data structure is implemented by an array of truncation points, and an element of the array indicates a byte position associated with a truncation point in the sequence of ordered bytes.

17. The UE of claim 15, wherein the data structure is implemented by a bitmap having a first number of bits, wherein a bit of the bitmap corresponds to a byte of the PDU, the bit is of a value 0 or a value 1.

18. The UE of claim 12, wherein the PDU and the truncation indicator are generated by the RLC layer, and the selecting of the truncation point from the set of truncation points is performed by the MAC layer.

19. A non-transitory computer-readable medium storing instructions that, when executed by a processor of a user equipment (UE), cause the UE to perform operations, the operations comprising:
generating, by a radio link control (RLC) layer of a protocol stack of the UE, a packet data unit (PDU) and a truncation indicator, wherein the truncation indicator indicates a set of truncation points of the PDU generated by the RLC layer of the UE, wherein the truncation indicator is implemented as a data structure comprising a bitmap or an array that is distinct from the PDU and the bitmap or the array having a length determined based on a number of bytes of the PDU, and an element of the bitmap or the array indicates a byte position associated with a truncation point within the bytes of the PDU;
sending, by the RLC layer to a medium access control (MAC) layer of the protocol stack, the PDU and the truncation indicator;
determining, by the MAC layer, whether an uplink transmission size based on an uplink grant is smaller than a first number of bytes included in the PDU;
selecting, in response to a determination that the uplink transmission size is smaller than the first number of bytes, a truncation point from the set of truncation points indicated by the truncation indicator; and
removing, by the MAC layer, at least a portion of the PDU to generate a truncated PDU having a second number of bytes smaller than the uplink transmission size, wherein the portion of the PDU being removed is determined at least based on the selected truncation point.

20. The non-transitory computer-readable medium of claim 19, the operations further comprising:
updating, by the MAC layer, a portion of the truncated PDU to generate an updated truncated PDU;
sending, by the MAC layer to the RLC layer, the updated truncated PDU; and
transmitting, by the RLC layer, the updated truncated PDU to a base station of a wireless network.

* * * * *